United States Patent
Yun

(10) Patent No.: US 9,024,554 B2
(45) Date of Patent: May 5, 2015

(54) METHOD FOR CONTROLLING INVERTER

(71) Applicant: LSIS Co., Ltd., Anyang-si, Gyeonggi-do (KR)

(72) Inventor: Hong Min Yun, Anyang-si (KR)

(73) Assignee: LSIS Co., Ltd., Anyang-si, Gyeonggi-do (KR)

( * ) Notice: Subject to any disclaimer, the term of this patent is extended or adjusted under 35 U.S.C. 154(b) by 221 days.

(21) Appl. No.: 13/756,204

(22) Filed: Jan. 31, 2013

(65) Prior Publication Data

US 2013/0193882 A1     Aug. 1, 2013

(30) Foreign Application Priority Data

Feb. 1, 2012   (KR) .................. 10-2012-0010222

(51) Int. Cl.
*H02P 6/04*    (2006.01)
*H02P 23/02*   (2006.01)
*H02P 3/00*    (2006.01)
*H02P 11/06*   (2006.01)
*H02P 27/06*   (2006.01)

(52) U.S. Cl.
CPC  *H02P 23/02* (2013.01); *H02P 3/00* (2013.01); *H02P 11/06* (2013.01); *H02P 27/06* (2013.01)

(58) Field of Classification Search
CPC ....... H02P 6/08; H02P 23/0036; H02P 27/06; H02P 3/00; H02P 3/06
USPC ............ 318/590, 599, 400.07, 400.09, 400.1, 318/400.21, 400.26
See application file for complete search history.

(56) References Cited

U.S. PATENT DOCUMENTS

| | | | | |
|---|---|---|---|---|
| 4,296,367 A | * | 10/1981 | Hirata | 318/808 |
| 4,443,750 A | * | 4/1984 | Altena | 318/808 |
| 4,880,474 A | * | 11/1989 | Koharagi et al. | 134/21 |
| 4,954,764 A | * | 9/1990 | Kim | 318/798 |
| 4,987,351 A | | 1/1991 | Disser et al. | |
| 5,296,791 A | * | 3/1994 | Hipp | 318/563 |
| 5,723,966 A | * | 3/1998 | Straka et al. | 318/650 |
| 5,764,024 A | * | 6/1998 | Wilson | 318/805 |
| 5,828,462 A | * | 10/1998 | Hashimoto et al. | 358/296 |
| 8,502,492 B2 | * | 8/2013 | Marcoccia | 318/729 |

FOREIGN PATENT DOCUMENTS

CN    101015115    8/2007
JP    2003-278659  10/2003

* cited by examiner

*Primary Examiner* — Bentsu Ro
*Assistant Examiner* — Thai Dinh
(74) *Attorney, Agent, or Firm* — Lee, Hong, Degerman, Kang & Waimey

(57) ABSTRACT

A method for controlling an inverter in a system including a load, a motor for driving the load, and an inverter for operating the motor comprises when a load amount of the load is reduced to below a sleep level, checking whether a time corresponding to a sleep delay has lapsed; when the load amount of the load is still below the sleep level even after the sleep delay, varying an operating frequency of the motor, and if there is no change in a feedback from the load in response to the variation in the operating frequency, controlling the inverter to enter a sleep mode.

7 Claims, 4 Drawing Sheets

METHOD FOR CONTROLLING INVERTER

CROSS-REFERENCE TO RELATED APPLICATIONS

Pursuant to 35 U.S.C. §119(a), this application claims the benefit of earlier filing date and right of priority to Korean Application No. 10-2012-0010222, filed on Feb. 1, 2012, the contents of which are hereby incorporated by reference herein in their entirety.

BACKGROUND OF THE INVENTION

1. Field of the Invention

The present disclosure relates to a method for controlling an inverter, and particularly, to a control method used in an inverter system driving a plurality of motors.

2. Background of the Invention

In an application field, such as a fan, a pump, or the like, in which a flow rate and an oil pressure are mainly controlled, a plurality of motors control a flow rate or an oil pressure. Here, in general, a single controller controls a plurality of motors.

A controller such as an inverter, or the like, receives a feedback of a control amount of a process and controls a variation, and if necessary, an auxiliary motor may be selectively operated all the time to uniformly maintain a feedback control amount.

FIG. 1 is a view illustrating a motor system controlled by a general inverter.

As illustrated in FIG. 1, the motor system includes an Alternating Current (abbreviated as AC hereinafter) power source 1, an inverter 2 controlling a motor 3, the motor 3, and an electric load (abbreviated as load hereinafter) 4.

The inverter 2 includes a converter 21 that converts AC into Direct Current (abbreviated as DC hereinafter), an initial charging resistor 22 that prevents an inflow of a surge current when electric power is applied, a switch 23 that separates the initial charging resistor 22 from a circuit after the surge current is restrained, a filter condenser 24 that smoothes a DC voltage, a pulse width modulation (abbreviated as PWM hereinafter) inverter unit 25 that includes a plurality of switching elements and converts a DC into an AC, a current detection unit 26 that detects an electric current for each of 3 phases, so called U, V, and W phases, a controller 27 that collects various types of information such as a DC voltage, a phase current, and the like, and instructing various operations, and a PWM controller 28 that generates a PWM signal by using a voltage command V* and a frequency command f* input from the controller 27 and applying a switching signal to each switching element for each phase of the PWM inverter unit 25.

The load 4, which is actually operated by the motor 3, feeds back a load amount to the controller 27.

In the foregoing configuration, upon receiving electric power from the AC power source 1, the inverter 2 converts an output voltage and an output frequency through power conversion, and supplies the same to the motor 3 to control a speed and a torque of the motor 3 efficiently.

The inverter 2 precisely controls a speed of the motor 3 to save energy and enhance energy quality, so it is commonly used in automation facilities such as various air blowers, pumps, machine tools, textile machinery, and the like.

In general, the inverter 2 controls a main motor by using a proportional integral and derivative (abbreviated as PID hereinafter) controller, upon receiving a control amount, as a feedback, of a process, and if necessary, the inverter 2 controls an external signal such that an auxiliary motor is selected to be operated all the time to uniformly maintain the feedback control amount.

In such a system, while a plurality of motors are being controlled, when a pre-set flow rate or oil pressure is insufficient or excessive so the load cannot be controlled by only a main motor, the inverter 2 actuates the auxiliary motor.

In this case, when the main motor is controlled, PID controlling is performed. When a load amount is small, a plurality of motors controlled by the inverter 2 enters a sleep mode to save energy.

In a system illustrated in FIG. 1, references for determining an application of a sleep mode and sequences are as follows.

(1) The plurality of motor controlled by the auxiliary motor should be in a halt state.

(2) The operating frequencies of a plurality of motors should be lower than is a sleep frequency satisfying a sleep condition.

(3) A feedback should be lower than a sleep level (Namely, the load amount should be small).

(4) More than a delay time has lapsed in a stable system (There is a band with respect to a change in the load amount).

In the related art system, when the foregoing conditions are met, energy can be saved through a sleep operation and a wake-up operation.

If the controller 27 of the inverter 2 determines that a control amount required for the load 4 is sufficient, the controller 27 stops outputting and the inverter 2 may stop the system. Here, a sensor (not shown) for detecting a load amount is periodically checked, and when the load amount is increased again the controller 27 starts to perform an operation appropriate for the load 4 by starting the inverter 2.

FIG. 2 is a timing view illustrating a sequence with respect to the sleep and wake operations of the inverter, in which the sleep operation and wake operation are repeated according to the foregoing method.

Namely, in the related art system, in general, the sleep operation and the wake-up operation are performed only through the operations of FIG. 2, in the load 4 which is generally insensitive to a change in a load amount in most cases.

However, in case of a load sensitive to a change in a load amount, or in case of a load which cannot manage a change in a load amount only by the band with respect to a change in the load amount, the sleep operation and the wake-up operation are repeated.

Also, according to circumstances, even when a sleep level and a wake-up level set to be relative to the sleep level are not appropriately set, a continuous abnormal operation of a mode occurs.

SUMMARY OF THE INVENTION

Therefore, an aspect of the detailed description is to provide a method for controlling an inverter capable of reducing energy required for an inverter system by controlling a sleep operation in consideration of load characteristics.

To achieve these and other advantages and in accordance with the purpose of this disclosure, as embodied and broadly described herein, a method for controlling an inverter in a system including an electric load, a motor for driving the load, and an inverter for operating the motor, the method comprising:

when a load amount of the load is reduced to below a sleep level, checking whether a time corresponding to a sleep delay has lapsed;

when the load amount of the load is still below the sleep level even after the sleep delay, varying an operating frequency of the motor; and controlling the inverter to enter a sleep mode.

The method may further comprise operating the motor in a normal state, when a feedback of the load amount is changed in response to the variation in the operating frequency.

In the controlling the inverter to enter a sleep mode, when the feedback of the load amount is not changed in response to the varied operating frequency, the inverter may be controlled to enter a sleep mode.

The method may further comprise: when the load amount of the load is above the sleep level after the sleep delay, operating the motor in a normal state.

To achieve these and other advantages and in accordance with the purpose of this disclosure, as embodied and broadly described herein, a method for controlling an inverter in a system including a load, a motor for driving the load, and an inverter for operating the motor, comprising: when an amount of the load is reduced to below a sleep level, checking whether a time corresponding to a sleep delay has lapsed;

when the amount of the load is still below the sleep level even after the sleep delay, accelerating an operating frequency of the motor to increase a feedback of the load to a predetermined level; and when the amount of the load is below the sleep level, controlling the inverter to enter the sleep mode.

The method may further comprise: when the feedback of the load has increased to the predetermined level and the amount of the load is above the sleep level, operating the motor in a normal state.

The method may further include: when the amount of the load is above the sleep level after the sleep delay, operating the motor in a normal state.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this disclosure, illustrate exemplary embodiments and together with the description serve to explain the principles of the invention.

In the drawings.

DETAILED DESCRIPTION OF THE INVENTION

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the disclosure, and are not intended to preclude the possibility that one or more other features, numbers, operations, actions, components, parts, or combinations thereof may exist or may be added.

Hereinafter, embodiments of the present invention will be described in detail with reference to the accompanying drawings.

Figure 1:
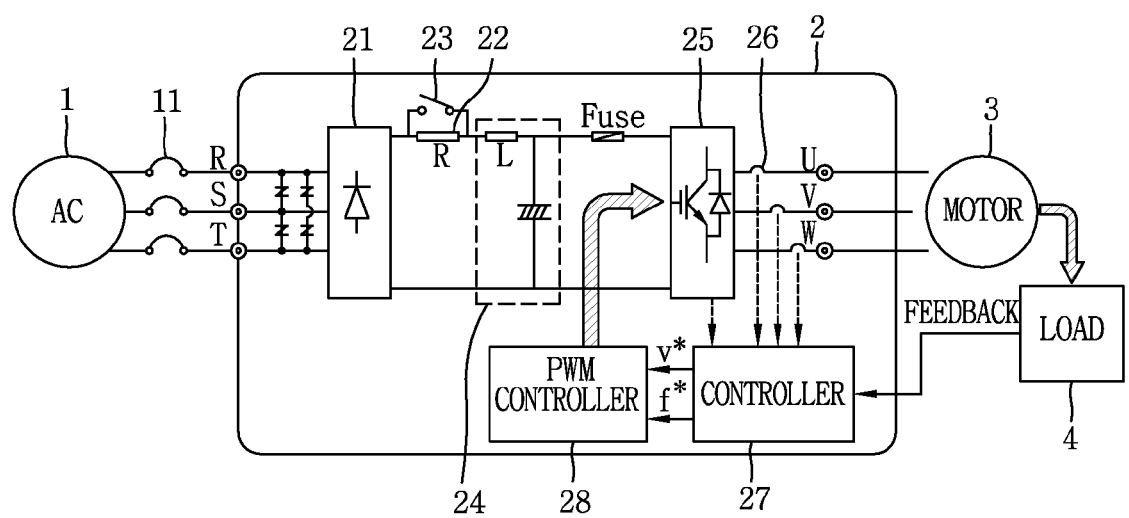
FIG. 1 is a view illustrating a configuration of a motor system controlled by an inverter.
Figure 2:
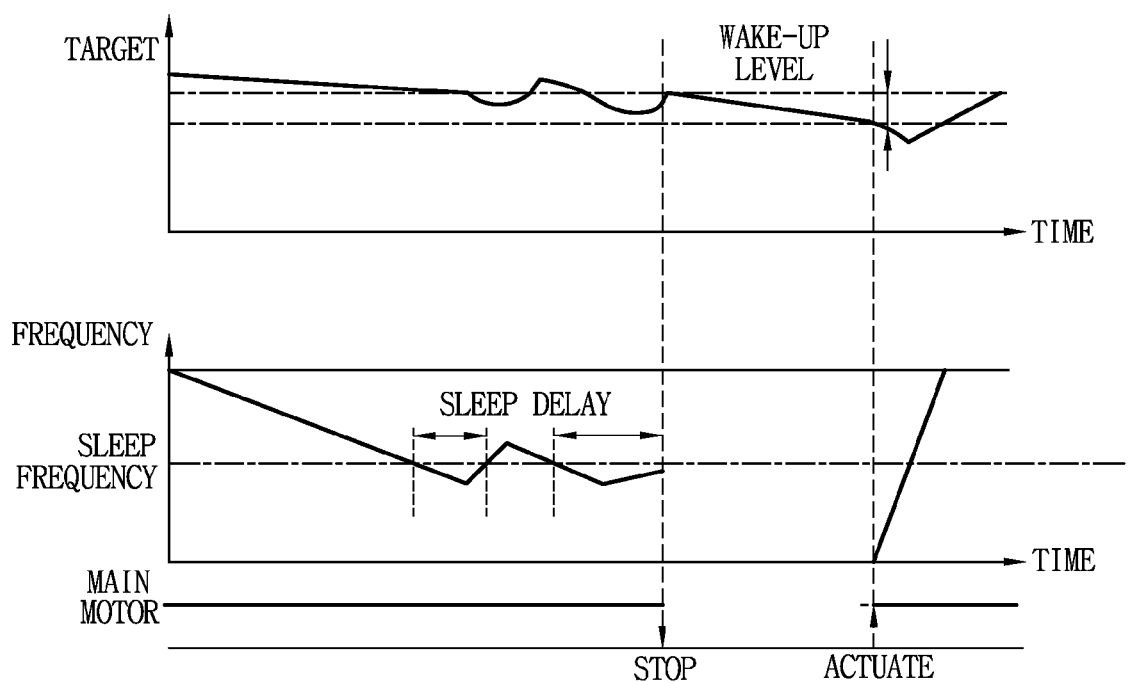
FIG. 2 is a timing diagram illustrating sequences with respect to a sleep operation and a wakeup operation of the inverter according to the related art.
Figure 3:
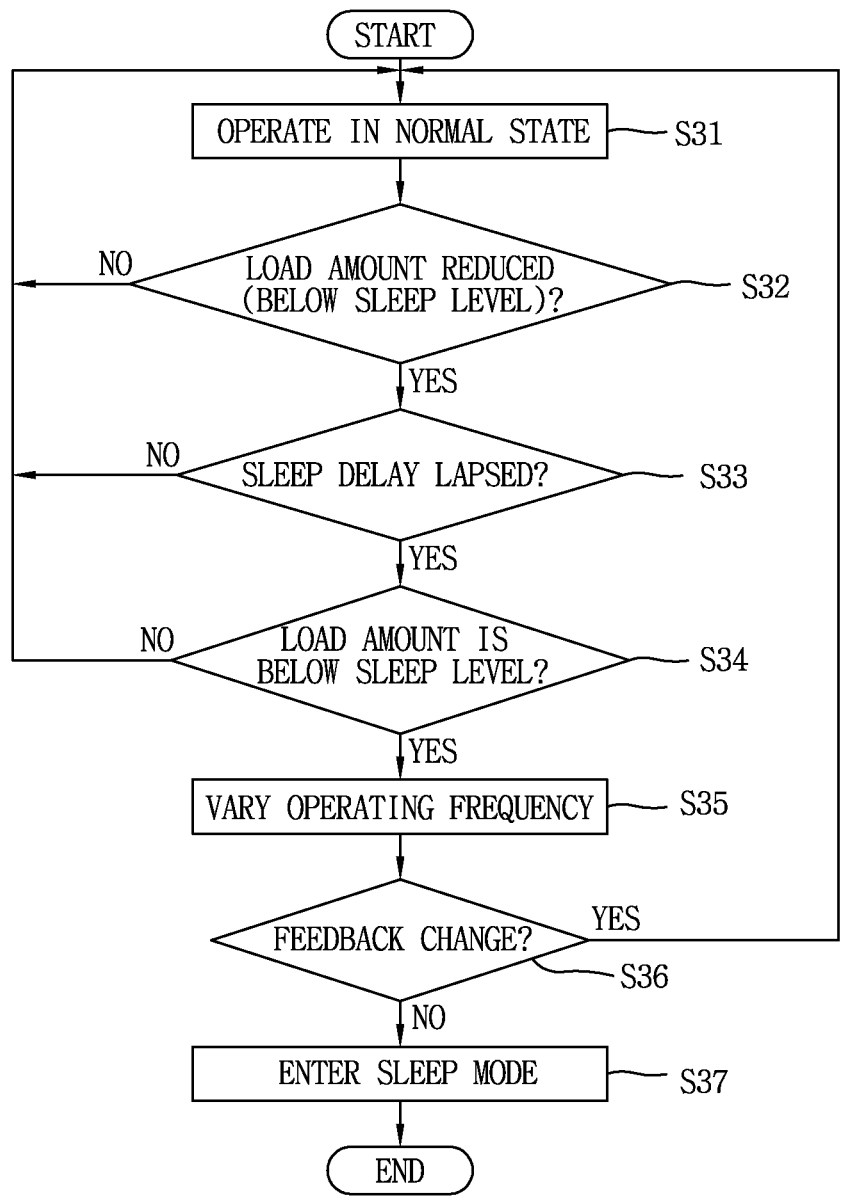
FIG. 3 is a flow chart illustrating a method for controlling an inverter according to an embodiment of the present invention.

FIG. 3 is a flow chart illustrating a method for controlling an inverter according to an embodiment of the present invention, showing controlling of entering a sleep mode, performed by the controller of the inverter system of FIG. 1.

The controller 27 of the inverter 2 of FIG. 1 controls a plurality of motors according to various methods such as multi-motor control (MMC), and the like, and operates the motors according to various methods such as MMC operation, or the like, in a normal state (S31).

In this case, when a load amount is reduced (S32), namely, in case that a normal operation is not required any longer, the inverter 2 in the related art inverter system is controlled to enter a sleep mode. However, as mentioned above, the inverter 2 may not actually enter the sleep mode according to a situation of the load 4, or although the inverter 2 enters the sleep mode, various errors may occur to cause the inverter 2 to wake up, so the present invention is devised to solve the problem.

At a point in time at which a load amount starts to be reduced (S32), there is no much difference between a pre-set pressure and a pressure fed back from the load 4 in many cases. In actuality, increment or decrement of the control amount in operation is repeated according to a slight pressure difference in the load 4. However, when the operating frequency is varied, whether the operation at the corresponding point in time is in a normal state or whether it is a repeated operation in a zero flow rate situation may be determined.

Thus, in the control method according to an embodiment of the present invention, whether to enter a sleep mode is determined by checking an actual load amount.

Namely, referring to FIG. 3, when the load amount is reduced to below a sleep level (S32), it is checked whether a time corresponding to a sleep delay has lapsed (S33).

When the load amount is below the sleep level even after the sleep delay (S34), it is determined that the load amount has been actually reduced. Namely, the load amount may be increased again after the sleep delay, so in an embodiment of the present invention, the motor 3 is continuously operated in a normal state (S31).

When the load amount of the load 4 is below the sleep level even after the sleep delay (S34), the controller 27 arbitrarily varies the operating frequency of the motor 3 (S35). When there is a change in the feedback from the load 4 (S36), the controller 27 continues to operate the motor 3 in a normal state. For example, when an operating frequency of the motor 3 is accelerated, if a feedback from the load 4 is increased, or when the operating frequency of the motor 3 is decelerated, if a feedback of the load 4 is reduced, the controller 27 determines that the motor 3 is operated normally and continues the normal state operation.

Although an operating frequency of the motor 3 is arbitrarily varied (S35), if there is no change in the feedback of the load 4 (S36), the controller 27 determines that the motor is in a no-load operation, so the inverter 2 enters the sleep mode (S37). Namely, the inverter 2 is stopped.

Figure 4:
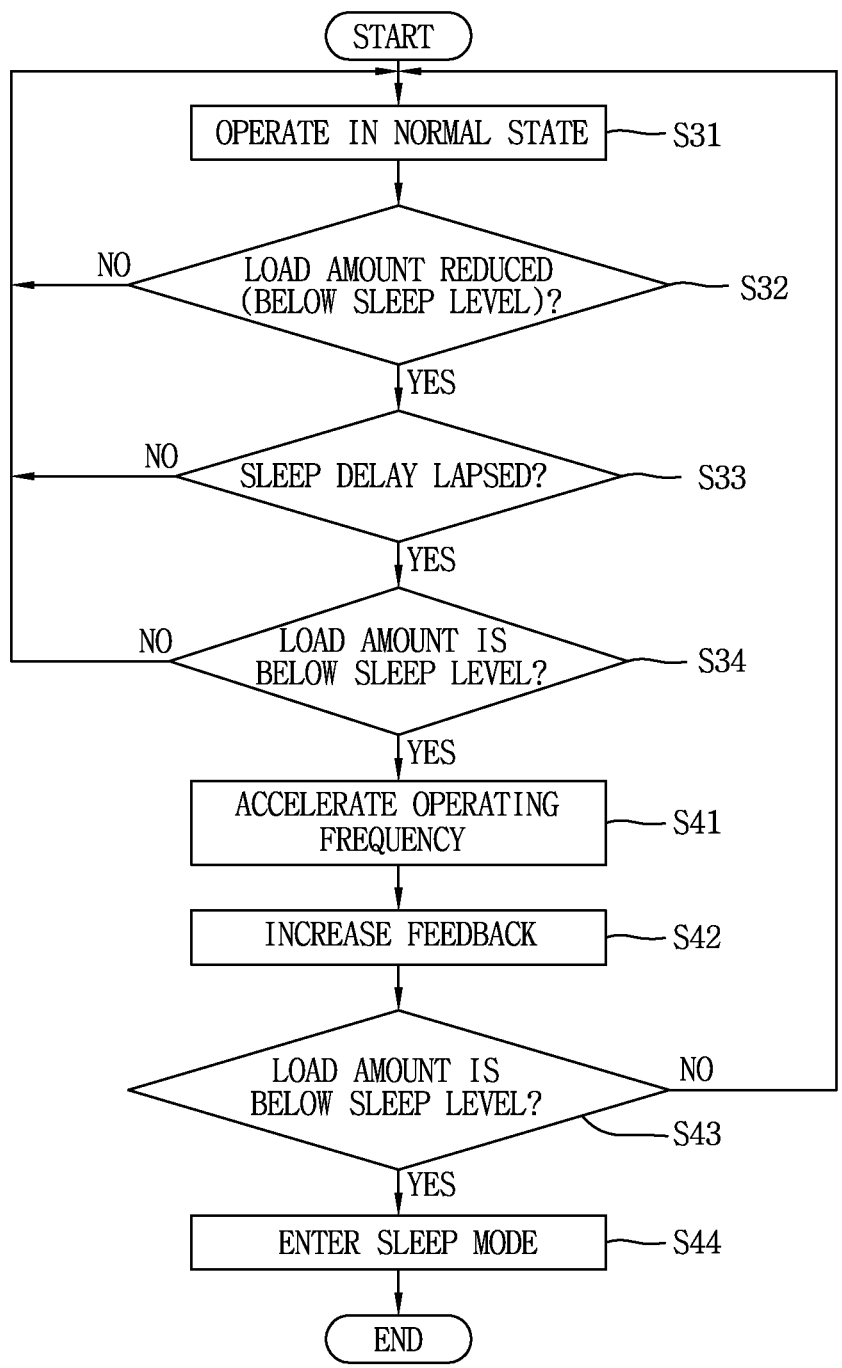
FIG. 4 is a flow chart illustrating a method for controlling an inverter according to another embodiment of the present invention.

FIG. 4 is a flow chart illustrating a method for controlling an inverter according to another embodiment of the present invention.

In an embodiment of the present invention, steps S31 to S34 in FIG. 4 are the same as those of FIG. 3. Namely, in a state that the controller 27 of the inverter 2 operates the motor 3 in a normal state, when a load amount of the load 4 is reduced to below the sleep level (S32), the controller 27 checks whether a time corresponding to a sleep delay has lapsed (S33).

When the load amount of the load 4 is still below the sleep level even after the sleep delay (S34), the controller 27 accelerates the operating frequency of the motor 3 (S41). In this case, a feedback from the load 4 is increased (S42), and when the feedback from the load 4 is increased to a pre-set value, the controller 27 checks again whether the load amount of the load 4 is below the sleep level (S43). When the load amount of the load 4 is below the sleep level (S43), the inverter enters the sleep mode (S44) and is stopped.

When the load amount of load 4 is not below the sleep level at S43, the controller 27 normally operates the motor 3 (S31).

According to embodiments of the present invention, the motor, which is idly rotated upon determining that there is an actual load, is controlled to enter the sleep mode, saving energy. In addition, an error due to a band, which is problematic in feedback, can be prevented.

Thus, according to embodiments of the present invention, optimal operation conditions are provided to a system in terms of energy saving, whereby a sensitive operation according to a change in a load amount can be prevented.

The embodiments of the present invention may be implemented by recording a computer-readable program code in a computer-readable recording medium. When the embodiments of the present invention are executed by using software, the constituent elements of the present invention are code segments. The program or code segments may be stored in a medium readable by a processor of a computer or may be transmitted by a computer data signal combined with a carrier wave signal from a transmission medium or a communication network.

The computer-readable recording medium includes all types of recording devices storing data readable by computer systems. Examples of the computer readable recording medium include ROM, RAM, CD-ROM, magnetic tapes, floppy disks, optical data storage devices, and the like. The computer-readable recording medium may be distributed over network-coupled computer systems so that the computer-readable code may be stored and executed in a distributed fashion.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A method for controlling an inverter in a system including an electric load, a motor for driving the load, and the inverter for operating the motor, the method comprising:
   determining a load amount of the load;
   allowing a time corresponding to a sleep delay to lapse when the load amount is below a sleep level;
   determining whether the load amount is below the sleep level after the time corresponding to the sleep delay has lapsed;
   varying an operating frequency of the motor to determine whether the motor is in a no-load operation when the load amount is below the sleep level after the time corresponding to the sleep delay has lapsed;
   determining whether the motor is in the no-load operation; and
   controlling the inverter to enter a sleep mode when it is determined that the motor is in the no-load operation.

2. The method of claim 1, further comprising operating the motor in a normal state when a feedback of the load amount is changed in response to varying the operating frequency.

3. The method of claim 1, wherein the motor is determined to be in the no-load operation when a feedback of the load amount is not changed in response to varying the operating frequency.

4. The method of claim 1, further comprising operating the motor in a normal state when the load amount is above the sleep level after the time corresponding to the sleep delay has lapsed.

5. A method for controlling an inverter in a system including an electric load, a motor for driving the load, and the inverter for operating the motor, the method comprising:
   determining a load amount of the load;
   allowing a time corresponding to a sleep delay to lapse when the load amount is below a sleep level;

determining whether the load amount is below the sleep level after the time corresponding to the sleep delay has lapsed;

accelerating an operating frequency of the motor to increase a feedback of the load to a predetermined level to determine whether the motor is in a no-load operation when the load amount is below the sleep level after the time corresponding to the sleep delay has lapsed;

determining that the motor is in a no-load operation when the load amount is below the sleep level after accelerating the operating frequency; and controlling the inverter to enter a sleep mode when the motor is in the no-load operation.

6. The method of claim 5, further comprising operating the motor in a normal state when the feedback of the load is increased to the predetermined level and the load amount is above the sleep level.

7. The method of claim 5, further comprising operating the motor in a normal state when the load amount is above the sleep level after the time corresponding to the sleep delay has lapsed.

* * * * *